United States Patent [19]

Rowlands

[11] 3,835,446

[45] Sept. 10, 1974

[54] CHIRP SIGNAL APPARATUS

[75] Inventor: Richard Rowlands, State College, Pa.

[73] Assignee: The United States of America as represented by the Secretary of the Navy, Washington, D.C.

[22] Filed: Nov. 25, 1966

[21] Appl. No.: 597,835

[52] U.S. Cl. .............................. 340/3 R, 340/3 FM
[51] Int. Cl. ............................................. G01s 7/52
[58] Field of Search....... 340/3, 3 FM; 343/17.2 PC; 333/71; 329/199

[56] References Cited
UNITED STATES PATENTS
2,217,828  10/1940  Wyckoff .......................... 333/71 X
2,406,800  9/1946  Busignies .......................... 333/71 X OTHER PUBLICATIONS
Zelinger, Electronics, Nov. 1954, pp. 173–175.

Primary Examiner—Richard A. Farley
Attorney, Agent, or Firm—R. S. Sciascia; Henry Hansen

[57] ABSTRACT

The apparatus disclosed herein includes a hydrophone for sensing underwater sonar signals, a gain controlled amplifier receiving the hydrophone output, and a chirp signal detector for detecting chirp signals having an instaneous frequency which increases with time. The chirp detector is further described as including a specially clamped reed which is electromagnetically driven into vibration having an instantaneous frequency equivalent to that of the sensed chirp signal and having an instantaneous peak amplitude corresponding to a characteristic nonlinear frequency vibration amplitude response. The apparatus disclosed further includes threshold detector means responsive to reed vibration amplitude for indicating the reception of the chirp signal to utilization apparatus.

12 Claims, 5 Drawing Figures

PATENTED SEP 10 1974 3,835,446
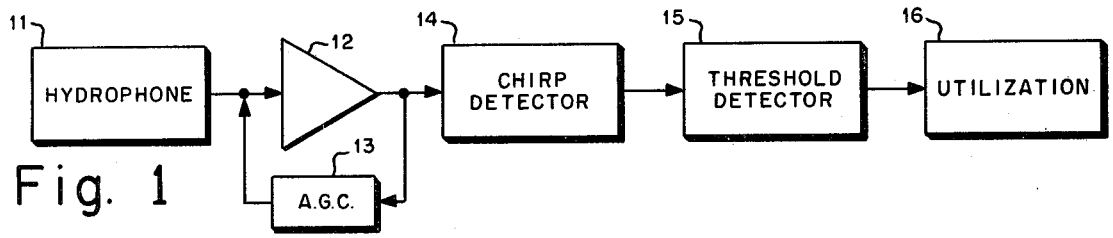
Fig. 1
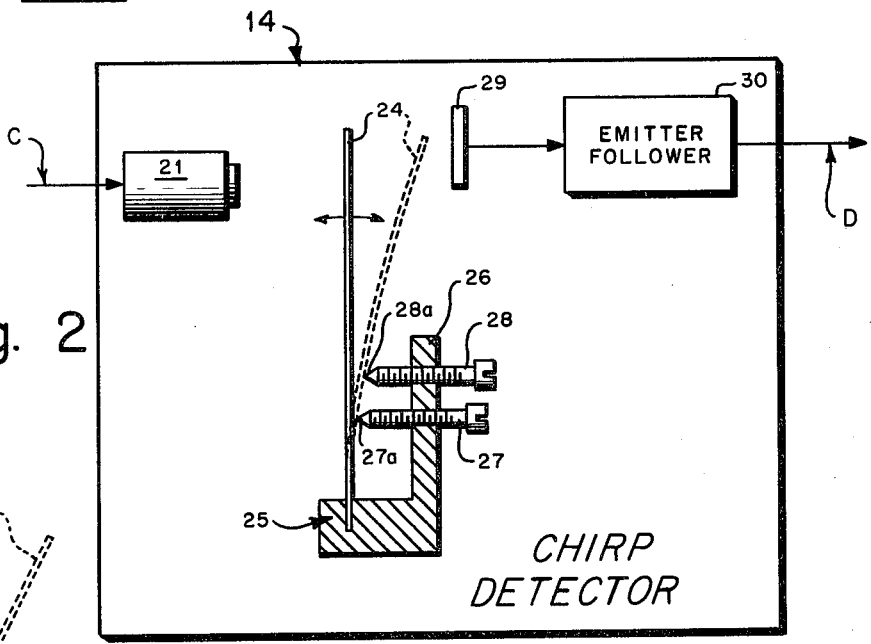
Fig. 2
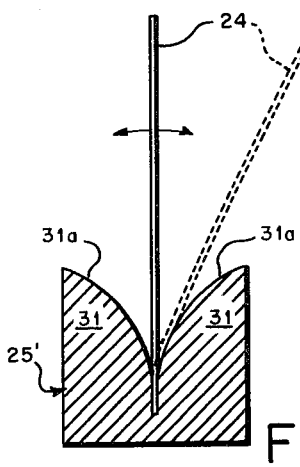
Fig. 5
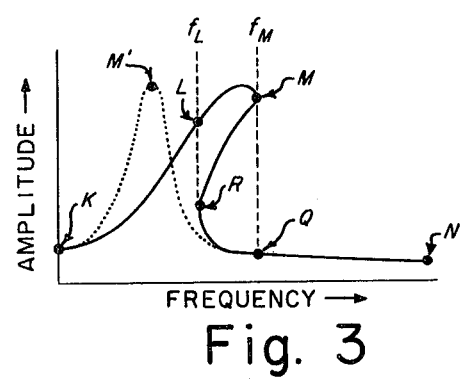
Fig. 3
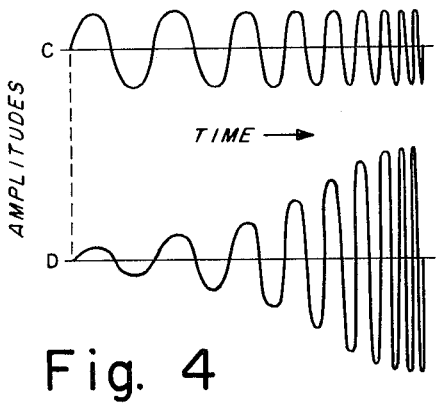
Fig. 4
INVENTOR.
RICHARD O. ROWLANDS
BY
ATTORNEY

CHIRP SIGNAL APPARATUS

It is known that in radar and sonar applications the use of chirp signals has certain advantages over the use of pulsed, continuous wave signals. Known chirp signal detection apparatus typically includes matched filters which are generally considered necessary to get a proper system response and good efficiency. Matched filters for detecting chirp signals in radar applications typically comprise either an electrical network with a time delay which is proportional frequency or a tapped delay line having a plurality of taps with progressively smaller spacing therebetween. Chirp signals usable in sonar applications involve longer signal durations, lower frequencies and problems of greater magnitude associated with Doppler and reverberation. The known types of matched filters suitable for detecting radar chirp signals tend to become very complicated when modified for use in sonar systems.

It is, therefore, an object of this invention to provide simpler apparatus for detecting chirp signals having frequencies and durations within range useful in sonar applications.

It is a further object of this invention to provide a novel and improved chirp signal detection apparatus which is more compact and is more easily constructed than is chirp signal detection apparatus heretofore known.

It is a still further object of this invention to provide a single vibratable reed having an adjustable characteristic nonlinear response of vibration amplitude with increasing frequency, which reed is suitable or use in detecting chirp signals.

Various other objects and advantages will appear from the following description of several embodiments of the invention, and the most novel features will be particularly pointed out hereinafter in connection with the appended claims.

It is a general purpose of this invention to provide simple apparatus for detecting chirp signals including those of instantaneous frequencies and durations which are useful in sonar applications. Briefly, this is accomplished in the embodiments of the invention disclosed herein by providing a novel electromagnetically driven, vibratable reed which has a characteristic type of nonlinear frequency response. The reed is driven into its characteristic vibration in response to a received chirp signal. Suitable apparatus for detecting the amplitude of reed vibration is provided to ascertain and indicate when an amplitude of reed vibration exceeding a threshold level has occurred and, thereby, to indicate in time the reception of a chirp signal.

In the drawing:

FIG. 1 is a block diagram of one embodiment of the invention including a chirp signal detector;

FIG. 2 represents a block and schematic diagram of one embodiment of the detector of FIG. 1 including a specially clamped reed;

FIG. 3 represents a postulated frequency-vibration amplitude response curve for the detector of FIG. 2;

FIG. 4 is a postulated time diagram of the input and output signals of the detector of FIG. 2; and FIG. 5 represents another embodiment of the specially clamped reed of FIG. 2.

Referring now to FIG. 1, the chirp signal responsive apparatus there disclosed includes a hydrophone 11 which is positioned to sense chirp signals such as emanate from an underwater sound source or echo from an underwater object. The hydrophone output comprises an electrical signal which has a component which varies in accordance with the chirp signal sensed. This output is fed into an amplifier 12 having an automatic gain control circuitry 13 conventionally associated therewith for producing an output which varies with the chirp signal within preset amplitude limits. This amplitude controlled signal is fed to a chirp detector 14, hereinafter more fully described, which produces in response to the input signal a characteristic chirp detector output signal fed to a threshold detector 15 which, in turn, produces an indication output signal in response to receiving a chirp detector output signal above a preset level. The indication signal from the threshold detector 15 is fed to utilization apparatus 16 such as a signal processing portion of a sonar system which uses the time occurrence of the indication output signal in computing range of underwater object in a manner well known in the sonar art. An electrical sample of a chirp signal being transmitted, of course, can be similarly processed through the amplifier 12, chirp detector 14, and threshold detector 15 and fed to the utilization apparatus 16.

One embodiment of the chirp detector 14, shown in detail in FIG. 2, includes an electromagnetic driver 21 such as a coil wrapped about a suitable core, the driver being connected to receive the amplitude controlled, hydrophone output from amplifier 12. The driver 21 sets up a magnetic field which changes in accordance with the signal received by the coil thereof. A resilient metal reed 24 is supported for transverse vibration by a clamp 25 which positions the free end of reed 24 within the changing magnetic field. The reed 24 is made of a material such as spring steel and is driven into vibration by the driver 21 in accordance with the input signal thereto. The clamp 25 further includes a protruding member 26 fixed thereto which member 26 has adjustably threaded therethrough a pair of screws 27 and 28 whose points 27a and 28a are positioned intermediate the free end of the reed 24, point 27a being spaced closer to the clamp end of the reed, and are spaced laterally from the at rest position of the reed, point 27a being spaced closer to the reed at rest than point 28a. A capacitive pickup 29 is appropriately positioned adjacent the maximum postulated excursion of the free end of the reed 24 during vibration and provides an electrical signal which varies in intensity with the amplitude of movement of the vibrating reed 24 from its rest position. The output signal of the pickup 29 is fed through an emitter follower 30 whose output signal comprises the chirp detector output signal fed to the threshold detector 15.

It is well known that a reed clamped at one end will vibrate with maximum amplitude when driven at its resonant frequency determinable in accordance with the reed dimensions, its material and the length of its free end. It is also known that an electromagnetically driven reed will vibrate with a frequency determined by the input frequency to the electromagnetic driving driving means and with a vibration amplitude primarily affected by the driving signal intensity if the input frequency thereof is substantially different from the resonant frequency of the reed. The amplitude of reed vibration at resonance is, of course, substantially greater than the normal vibration amplitude component attributable to the driving signal intensity. Hence, if a signal of increasing frequency is fed to the driver 21, the reed 24 will begin to vibrate with an amplitude which is at first primarily affected by the driver input signal intensity and thereafter is increased as the frequency of the input signal begins to approach the resonant frequency of the reed. However, referring to FIG. 2, the point 27a of the screw 27 is appropriately positioned to be periodically engaged by the lateral surface of the reed 24 during its vibration whereby further transverse reed deflection is impeded at some amplitude level caused by a driving signal having a frequency close to but below the resonant frequency of the unimpeded reed. When the reed 24 touches the point 27a of the screw 27, the effective length of its free end is shortened. This is thought to cause an upward shift in the frequency at which the reed 24 as impeded by the screw 27 will experience an enhanced amplitude of vibration. It is to be noted that a clamp 25 having only one screw such as 27 will enable a satisfactory reed vibration for use in chirp signal detectors according to the invention.

The second screw 28 facilitates a smoother frequency vibration amplitude response and reduces the possibility of a false alarm. If the above described, enhanced amplitude of vibration is sufficient to cause the reed 24 to engage point 28a of screw 28 and if the frequecy of the input signal to driver 21 has increased to one which roughly approximates the resonant frequency of the free end of the reed 24 from point 28a, the amplitude of vibration of the reed 24 would be further enhanced. This increase in vibration amplitude would be sensed by the pickup 29 whereby the envelope amplitude of the output signal of the emitter follower 30 would be further increased.

FIG. 3 represents a typical reed response curve describing various vibration amplitudes of a representative reed according to the invention which occur when the driving frequency is increased and the driving force remains substantially constant throughout the change in driving frequency. This response curve provides a basis upon which to postulate a theory of operation for the reed in connection with detection of chirp signals. The curve disclosed is typical of several types of vibratable reeds with a nonlinear response including the type disclosed in FIG. 2. As the frequency of the input signal to the driver is increased, the amplitude of vibration of the reed increases from point K through L, at a frequency $f_L$, to M, at a frequency $f_M$, whereupon the amplitude abruptly drops to point Q and thereafter declines to point N. Conversely, when the frequency is decreased from a frequency as at point N, the vibration amplitude slowly increases to point Q at $f_M$ and thereafter increases to a point R at $f_L$ whereupon the vibration amplitude abruptly rises to point L and thereafter declines to point K. An unstable region of amplitude response exists for input signals having pure tones of frequencies between $f_L$ and $f_M$. The above-described curve is to be distinguished from the curve KM'QN shown in dotted lines for an unimpeded reed.

It is postulated that in order for the reed to respond with an amplitude exceeding that at point L the reed must have been driven by progressively increasing frequencies. Therefore, the maximum possible vibration amplitude will not occur unless the reed 24 has been driven into vibration such that the point 27a is periodically engaged at times when the presence of a higher frequency in the driver input signal enhances the vibration amplitude as indicated above.

Referring now to FIG. 4, the waveform C represents a typical chirp signal having an increasing frequency with time. The emitter follower 30 has an output typically resembling that in waveform D in FIG. 4, the envelope of which is postulated to resemble the shape of the curve KLM of FIG. 3.

FIG. 5 discloses another embodiment of a clamp 25' for a vibratable reed. The clamp 25' includes a pair of symmetrical projections 31 which have reed facing surfaces 31a which flare away from the clamped end of the reed 24. The surfaces are preferably convex as shown and have slopes which progressively decrease as a function of increasing distance from the clamped end of the reed. Successive points on the symmetrical surfaces 31a are analagous to successive settings of the points 27a, 28a of the screws 27 and 28 in FIG. 2. As the reed 24 is driven into vibration at increasingly higher frequencies the effective length of the free end of the reed is progressively decreased so that the higher driver input signal frequencies further enhance the vibration amplitude of the reed as was indicated above in the case of clamp 25. The reed 24 as clamped in the more easily fabricated clamp 25' is postulated to have, at a given frequency, a more symmetrical deflection with respect to its rest position than does the reed 24 as clamped in clamp 25.

The clamps 25 and 25' are probably more easily designed by trial and error since the motion of the vibrating reed during a chirp signal is very complex. For the clamp 25, the respective separation distances of the points 27a and 28a from the at rest position of the reed 24 are adjusted until a maximum vibration amplitude response is obtained for the reed upon reception of a desired chirp signal having a particular range of instantaneous frequencies and a particular rate of increase of frequency with time. A clamp similar to 25 having more than two screws can be used to ascertain the best shape for the surfaces 31a of the clamp 25' as an alternative to mathematical construction of the shape.

It is seen that if the chirp signal includes frequencies within the range between $f_L$ and $f_M$, the threshold detector 15 may be adjusted to provide the indication output signal when the amplitude of vibration of the reed exceeds that present at $f_L$. It is to be remembered that in order to obtain this maximum vibrational amplitude the chirp signal frequency should have increased from some frequency below $f_L$ so that the effective length of the free end is decreased for amplitude enhancement by the increased frequencies of the chirp signal.

The rate of change of frequency of the chirp signal to be detected is a design factor to be considered in that this rate of change must be such that it does not prevent the instantaneous peak amplitude of the reed from rising to the values which are on the curve between points L and M. A further condition for satisfactory operation is that the amplitude response of a given reed as a function of $\tau$, the period of time taken for the frequency of the chirp signal to change from an initial value $f_0$ to a value $f_L$, must be greater at $f_L$ than the lower steady state amplitude of the signal at $f_L$, i.e, point R on the curve of FIG. 3. It has been further found for signal duration times exceeding $\tau$ that the rate of change of the transient response of the asymptotic value of vibration with respect to time should be greater than the rate of change of the middle unstable state amplitude from $f_L$ to $f_M$, i.e. from R to M.

Thus, there has been provided chirp signal responsive apparatus including a chirp signal detector which naturally responds to chirp signals of increasing frequency but does not respond to noise even though it may contain frequency components within the range of instantaneous frequencies included in the chirp signal.

It should be understood, of course, that the foregoing disclosure relates only to preferred embodiments of the invention and that numerous modifications or alterations may be made without departing from the spirit and scope of the invention as set forth in the appended claims.

What is claimed is:

1. Chirp signal responsive apparatus comprising:
   first means providing a first electrical output signal representative of a chirp signal whose frequency increases with time;
   second means connected to said first means for receiving said first electrical output signal and producing in response thereto a magnetic field of corresponding frequency;
   clamping means;
   a resilient reed having one end clamped by said clamping means and having a free end positioned in said field for vibration;
   third means positioned intermediate the clamped and free ends of said reed and spaced from the rest position of said reed a distance to limit the excursion of a portion of the reed along its length during vibration and to increase the instantaneous resonant frequency of said reed; and
   fourth means positioned adjacent the free end of said reed for providing a second electrical output signal which varies as a function of the amplitude of vibration of said free end.

2. Apparatus according to claim 1 wherein said first means includes:
   means for limiting the amplitude of said first electrical output signal.

3. Apparatus according to claim 2 further comprising:
   fifth means connected to said fourth means for receiving said second electrical output signal and for producing an indication signal in response to said second electrical output signal exceeding a threshold level.

4. Apparatus according to claim 1 further comprising:
   fifth means connected to said fourth means for receiving said second electrical output signal and for producing an indication signal in response to said second electrical output signal exceeding a threshold level.

5. Apparatus according to claim 1 wherein said third means comprises:
   support means; and
   a screw adjustably threaded therethrough having an end thereof positioned adjacent said reed intermediate its free and clamped ends.

6. Apparatus according to claim 1 wherein said third means further comprises:
   support means extending from said clamping means; and
   a plurality of screws adjustably threaded through said support means each having an end thereof positioned and respective distance intermediate said clamped and free ends of said reed, the end of one said screw positioned further from said clamped end of said reed being laterally separated from said reed at rest a greater distance than is the end of another said screw positioned closer to said clamped end of said reed.

7. Apparatus according to claim 6 wherein said first means includes:
   means for limiting the amplitude of said first electrical output signal.

8. Apparatus according to claim 1 wherein said third means comprises:
   a projection extending from said clamping means in the direction of said free end of said reed and having a reed excursion limiting surface extending from said clamped end of said reed, portions of said surface positioned progressively further from said clamped end being separated progressively greater distances from said reed at rest.

9. Apparatus according to claim 1 wherein said third means further comprises:
   a pair of projections extending from said clamping means in the direction of said free end of said reed on respective sides of said reed and having identical opposed, convexly shaped reed excursion limiting surfaces flaring away from said clamped end.

10. Apparatus according to claim 9 wherein said first means includes:
    means for limiting the amplitude of said first electrical output signal.

11. Apparatus responsive to an electrical chirp signal of frequency varying in time in a predetermined manner comprising:
    drive means responsive to an input signal for producing a magnetic field;
    reed means positioned in said field for vibrating in response thereto;
    resonant frequency modifying means positioned adjacent to said reed means for modifying the instantaneous resonant frequency of said reed only when a predetermined amplitude of reed vibration is exceeded; and
    detector means adjacent to said reed means for producing an electrical signal indicative of the amplitude of reed vibration.

12. Apparatus according to claim 11 wherein:
    said reed means includes a vibratable reed having a resonant frequency and clamped at one end; and
    said resonant frequency modifying means includes surface means spaced a predetermined distance from a rest position of said reed for engagement with a medial portion of said reed when said reed is excited into vibration at its resonant frequency, said surface means being formed for causing an instantaneous decrease in the effective length of the free end of said reed when engaged by said reed during vibration.

* * * * *